United States Patent
Jernigan

[15] 3,698,500
[45] Oct. 17, 1972

[54] TWO-TRACK VEHICLE
[72] Inventor: Albert T. Jernigan, Payson Route P.O. Box 210, Globe, Ariz. 85501
[22] Filed: May 19, 1969
[21] Appl. No.: 840,579

Related U.S. Application Data
[63] Continuation-in-part of Ser. No. 780,402, Dec. 2, 1968, abandoned.

[52] U.S. Cl. ................................180/6.7, 74/722
[51] Int. Cl. ............................................B62d 11/08
[58] Field of Search ...............180/6.7, 6.2, 5; 115/1; 74/722

[56] References Cited
UNITED STATES PATENTS

| | | |
|---|---|---|
| 2,656,904 | 10/1953 | Grenier...................180/5 UX |
| 2,765,860 | 10/1956 | Church...................180/6.7 X |
| 2,778,437 | 1/1957 | Robinson et al..........74/722 X |
| 3,474,751 | 10/1969 | Hebert.................180/6.2 UX |

Primary Examiner—Benjamin Hersh
Assistant Examiner—John A. Pekar
Attorney—Hiram A. Sturges

[57] ABSTRACT

An off-the-road vehicle having two tracks for operating on soft terrain and having two belt clutches one for each track.

2 Claims, 7 Drawing Figures

PATENTED OCT 17 1972

INVENTOR:
ALBERT T. JERNIGAN

INVENTOR:
ALBERT T. JERNIGAN

INVENTOR:
ALBERT T. JERNIGAN

TWO-TRACK VEHICLE

This invention is a continuation-in-part of a patent application Ser. No. 780,402, now abandoned titled TWO-TRACK VEHICLE, filed Dec. 2, 1968, the inventor being Albert T. Jernigan.

FIELD OF THE INVENTION

This invention is in the field of two-track off-the-road vehicles such as snowmobiles which are capable of operating on soft terrain such as snow or mud or on very irregular terrain such as rough and rocky areas and for operation at speeds in excess of 20 miles an hour.

DESCRIPTION OF THE PRIOR ART

Prior art snowmobiles have traditionally had a single wide power-operated track beneath the rearward portion and one or two skis supporting the forward portion. They are generally operated at speeds between 25–40 miles an hour.

Snowmobiles have had great difficulty in turning because of slipping of the skis.

For this reason, it is desirable to make snowmobiles with two tracks so that one can be stopped while the other is powered in order to make quicker more safe turns so that trees, for example, can be dodged. However, there is a very substantial cost to two separate conventional mechanical clutches which would place the retail cost of a two-track snowmobile out of the reach of most buyers.

This is because most such clutches have multi-disc friction components and complicated inner parts with a center shaft which must be supported by bearings and connected to the clutches by joints. Such components are expensive and heavy.

This extra weight of mechanical clutches makes necessary a heavier frame and larger engine, adding more to the cost. Then, because of the greater weight, a more costly and wider track becomes needed, and so I have considered it very important to eliminate mechanical clutches in an off-the-road vehicle.

The use of two completely separate motors, one to drive each track, does not solve the cost problem, either. Although belt clutches are economical and have been used in go-carts, it is not practical to use a single belt clutch in a two-track vehicle because a separate drive is needed for each track so that the tracks can operate independently. An additional disadvantage of the go-cart type belt clutch is that such clutches are of the type having the driving pulley shaft laterally movable in order to stretch the belt.

In a two-track vehicle, a laterally shifting drive pulley shaft would be suitable to drive only one of the tracks because there would be no good way to take care of the other track with a single belt clutch.

I had conceived of driving each track with a belt clutch of a type having a conventional laterally shifting drive pulley shaft for tightening, but this requires the need of extra parts with extra expense. And there is no room on the motor shaft for two automatic engine load control mechanisms of the type that have the same effect as changing of gear ratio has by giving the motor greater leverage against the load at starting and slow speeds than at high speeds.

And yet, two such units would be needed if two such belt clutches of the laterally shifting pulley shaft type were used.

A third disadvantage is that even if the load control units were able to be put on an elongated crank shaft, then the lateral width of the assembly would take up so much room as to be a disadvantage, since the lateral width is already taken by space for two tracks and an engine mounted with its shaft preferably transverse of the vehicle.

SUMMARY OF THE INVENTION

A two-track vehicle for use in both soft and rough terrain, portions of the tracks being the lowest parts of the vehicle during operation, the vehicle being established as a vehicle for off-the-road use by having tracks which are of the type which are sufficiently wide as to be for the purpose of substantially supporting the weight of the vehicle and the weight of a man operating the vehicle and sitting thereon sufficiently for effective locomotion on both soft and rough terrain including soft snow.

The vehicle is further characterized as a true off-the-road vehicle by the fact that its tracks are supported by a roller means attached to the frame by track mounting means including springs for cushioning the shock from rough terrain.

The vehicle further characterized as an off-the-road track vehicle by the fact that cog wheels drive the tracks by having cogs extending into spaced recesses in the tracks. The new invention comprising the improvement in an off-the-road vehicle as thus described which comprises belt clutches, one for each side of the vehicle, the belts of which are tightened by belt engagers which are normally held in a belt-tightening position by springs but which can be moved from a belt-tightening position to belt-release position as is accomplished in response to the application of steering force on a steering assembly by the operator. When a belt is released so that it does not make a driving connection, then a track which it normally drives is not driven whereby the vehicle will conveniently turn since the steering assembly causes but one belt to be released at a time whereby the opposite belt is tight for driving the opposite track to cause turning.

An additional feature to affect turning is the presence of belt brakes connected to the steering assembly in a manner for automatic operation simultaneously with operation of the belt tightening and releasing mechanism so that when power is not being transferred to a belt which would ordinarily drive one of the tracks, then a separate belt brake on a shaft driving that track is caused to set for braking that track to further cause the vehicle to turn rapidly. The steering assembly having a manually engageable control member, such a a handle-bar, which is connected to a support means in a lower part of the vehicle by means of a connecting means which has a concave rearward side for extending around the forward and underside of the major portion of a well in the vehicle which receives the legs of the operator so that the lower portion of the connecting means of the steering assembly can be adjacent, but more out of the way of the position of the operator's legs, the handle-bar and the connecting means being swingable to the right or left of the vehicle, and cables being connected to the connecting means of the steering assembly at a point sufficiently higher than an axis of rotation of the lowermost part of the steering assembly so that a considerable mothin is transferred to the cables for gaining effective control of the belt clutches, the magnitude of this motion being much greater than would be the case if the cables attached to the connecting portion of the steering assembly were at a lower point in the frame so that it would not need to interfere with the leg well, but the construction of having the connecting portion concave on its rearward side accomplishing both the provision of clear space for the operator's legs and also the possibility of a higher point of connection for the cables for gaining a desired magnitude of motion and so that this desired magnitude of motion can be achieved without the undesirable need of having to move the handle-bar to the left or right to an awkward degree in order to gain a sufficient magnitude of cable-pulling motion.

And the combination in which a certain first and second movers in the control of the belt clutches are specifically first and second elongated levers extending longitudinally of the frame and pivotally mounted on the frame at mid-sections of the levers, whereby the levers can be normally held by springs in a position so that belt engagers on their rearward ends will hold the belts of the belt clutches taut for driving, and yet whereby a cable system attached to the steering assembly can effectively raise forward ends of the levers against the tension of the respective spring for releasing pressure on the belts of the respective belt clutches.

The vehicle as summarized above but in which parts engaging the ground are instead defined in a more inclusive manner as being ground-engaging means having right and left ground-engaging portions disposed on the right and left hand sides of the vehicle and movable with respect to the frame, the widths of the ground-engaging portions on the right and left sides each being definable as follows: The areas of a flat horizontal surface supporting the vehicle and which would be touched by either one of the right and left ground-engaging portions and which lie along a straight line extending from side-to-side of the vehicle being spaced apart a distance which is at least one-sixth of the total width of the vehicle for vehicle support on soft terrain and for better travel on rought terrain. In addition, the ground-engaging means is of sufficient size, as viewed from the underside of the vehicle, as to be suitable for the purpose of substantially supporting the weight of the vehicle and the weight of a man operating the vehicle sufficiently for effective locomotion on both soft and rough terrain, and the ground-engaging means being driven by the V-belt pulley system above described.

Figure 1:
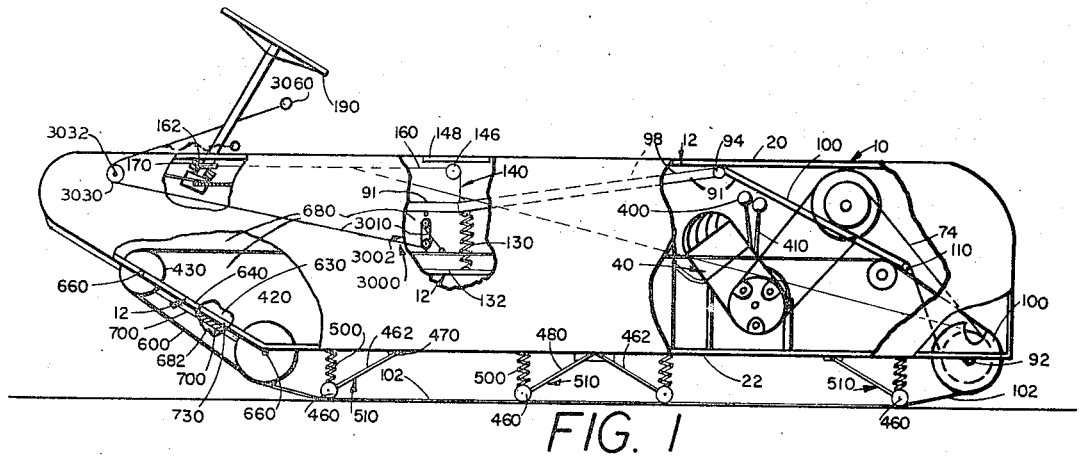
FIG. 1 is a side elevation of the two-track snow and rough terrain vehicle of this invention with parts broken away and other parts shown in dotted line.
Figure 2:
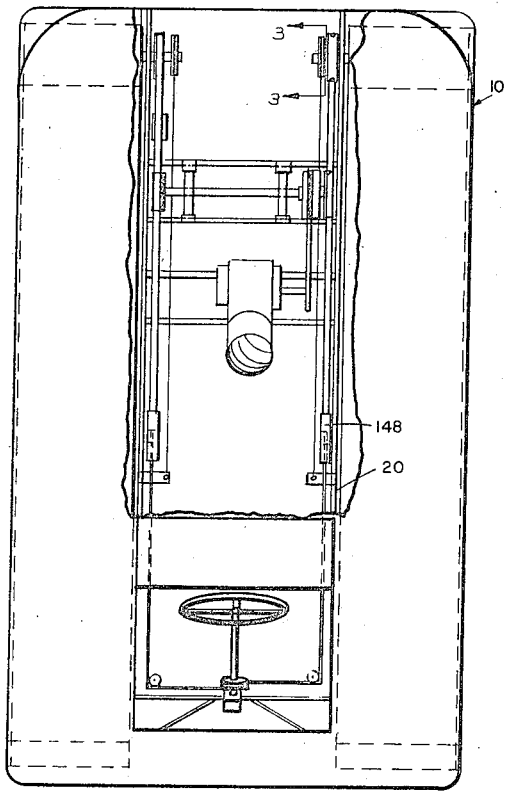
FIG. 2 is a top plan view of the vehicle of this invention with parts broken away.

The two-track vehicle of this invention is generally indicated in FIG. 1 at 10 and has a frame 12.

The frame 12 has upper and lower horizontally extending longitudinal frame members 20 and 22 and upper and lower horizontally extending frame members 30 and 32.

Figure 5:
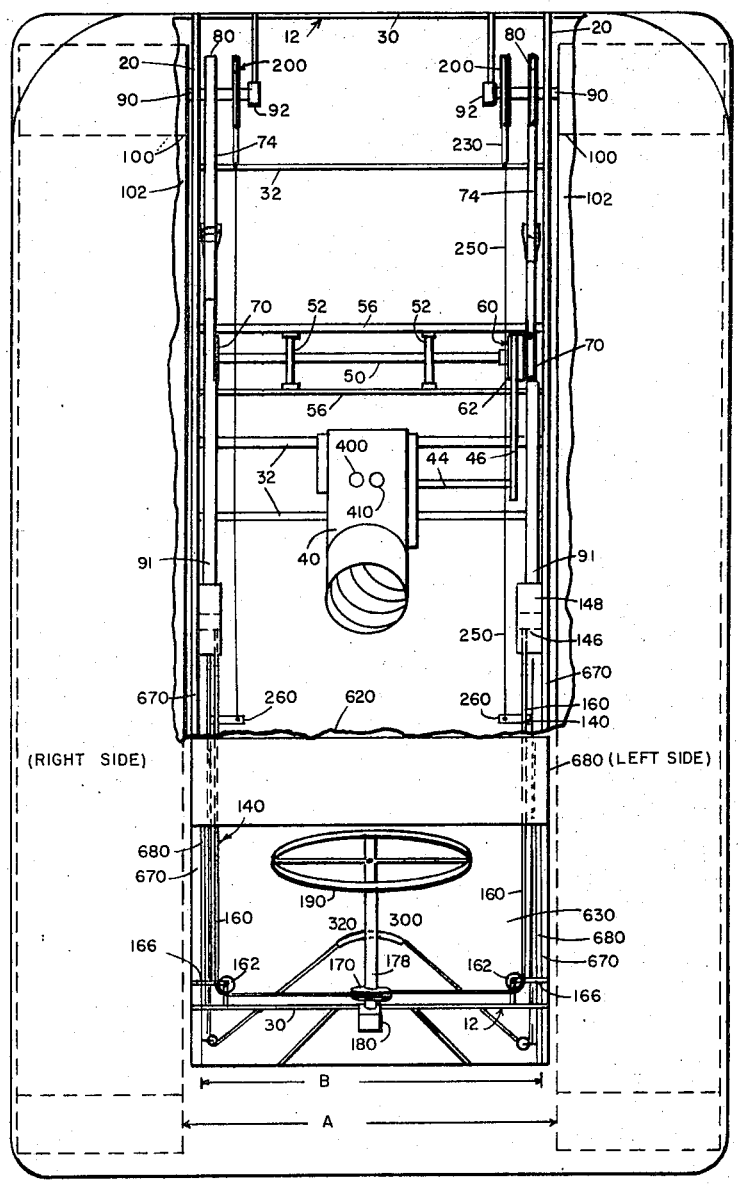
FIG. 5 is a top plan view of the vehicle of this invention with parts broken away.

The vehicle is powered by a single engine generally indicated at 40 mounted on frame members 22, as best seen in FIG. 5, and having a shaft 44 connected by a belt drive assembly 46 to an intermediate driving shaft 50 supported in bearings 52 connected to horizontal members 56 of the frame 12. The shaft 50 extends horizontally and is disposed to the rearward of and above the motor crank shaft 44 and the belt drive assembly 46 has as an important one of its parts an automatically varying ratio drive assembly generally indicated at 60 which shall later be described but which has the effect of causing the drive from the crank shaft 44 to the intermediate driving shaft 50 to apply greater power to the shaft 50 at lower speeds of the engine 40 with the effective diameter of the two-part pulley portion 62 of the assembly 60 of greater size as speeds of the engine 40 increase.

A pair of driving pulleys 70 are provided on each end of the shaft 50 and these are connected by a V-blet 74 respectively to respective ones of a pair of driven pulleys 80. The driven pulleys 80 are mounted on driven shafts 90 which extend horizontally and are disposed on the right and left-hand sides of the vehicle respectively and are mounted in bearings 92 mounted on the frame 12, each of the driven shafts 90 have mounted on their outer portions track drive pulley means 100 which have right and left tracks 102 disposed thereon respectively, the undersides of the track drive pulley means 100 extending downwardly below the frame 12, as best seen in FIG. 1.

The V-belts 74 extend about their pulleys with slack in them so as to prevent transfer of driving power and this slack is taken out of the V-belts 74 by the operation of a slack lever or slack take-up lever 91 for each belt 74, the slack levers 91 as seen in FIG. 1 extending generally longitudinally of the vehicle and having their center part pivotally secured by means 94 to the frame 12 of the vehicle so that when a forwardly extending portion 98 of the lever 91 is moved downwardly, then a rearwardly extending portion 100 of a lever 91 moves rearwardly and upwardly so that a pulley rotatably mounted on the rearward end of the rearward lever 100, the pulley being seen at 110, will engage the forward side of a respective belt 74 for pressing it upwardly and rearwardly to make it taut for driving power transfer.

The forward portion 98 of each lever 91 is normally held downward for the transfer of driving power by the belt 74 by means of a spring 130 secured to the forward end of the lever 98 and extending downwardly and attached to a portion 132 of the frame 12 disposed immediately beneath the respective lever portion 98.

Driving pressure from the lever 91 is relieved by means of a cable 140 which is attached to the forward end of the forward part 98 of the lever 91 and which extends upwardly over a pulley 146 secured to a bracket 148 mounted on the frame member 20 which is immediately thereabove.

From the pulleys 146 horizontally extending portions 160 of the cables 140 extend forward to respective pulleys 162 which are themselves mounted on the frame 12 by means of bracket means 166, the cables extending horizontally inwardly from the pulleys 162 respectively and being disposed around a drum 170 mounted on a rotatable steering column 178 which is mounted on the frame 12 by mounting 180 for rotation with respect to the frame 12 when a steering wheel 190 at the upper end of the column 198 is rotated.

Figure 3:
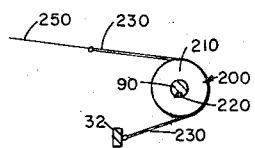
FIG. 3 is a sectional view taken along the line 3—3 of FIG. 2.
Figure 4:
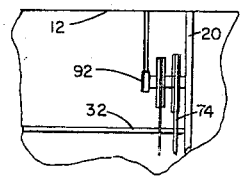
FIG. 4 is a detail of one of the belt clutch and belt brake areas as seen in top plan view with the top cover removed.

The braking of the vehicle is accomplished by means of a pair of belt brakes or belt brake assemblies 200, one of which is shown in detail in FIG. 3, the assemblies 200 each having a pulley 210 mounted on a right and left shaft 90 respectively and secured thereto by means of a key 220 so as to rotate only therewith.

A V-belt 230 extends over a pulley 210, as best seen in FIG. 3 and has its lower end anchored to a horizontally extending frame member 32 which is located below and forwardly of the pulleys 210. The upper end of the V-belt 230 extends forwardly from the rearward side of the respective pulley 210 and is secured to a cable 250 which extends forwardly to a connector 260, which latter is on the right and left-hand sides respectively connected to the mid-section of the respective right and left horizontal and forwardly extending portions 160 of the cables 140.

OPERATION

To operate, the motor 40 is started and it is caused to be in a suitable low forward gear by any suitable gear shift means thereon. For convenience of illustration, a gear shift lever 400 is shown in FIG. 1 which can be used for shifting the motor assembly to a forward lower gear or other forward higher gears and also into a reverse gear. It is to be understood that in actual operation, control of the motor assembly 40 would be done by placing it nearer the driver's position by the steering wheel 190, but this is all common in the art, so will, for convenience of illustration, be shown by means of the gear lever 400.

With the motor assembly 40 in a forward low gear, the vehicle is ready to move forward since, as shown in FIG. 1, the steering wheel is in a position for permitting the springs 130 to hold downwardly on the forward ends of the levers 91, whereby the belt 74 on the right and left sides of both are taut for driving, and therefore, each track 102 is being driven.

However, when the operator desires to turn the vehicle, for example, by turning the steering wheel 190 to the right side of the vehicle in the direction of the arrow 300 of FIG. 5, then it will be seen that the cable 140 on the left side of the vehicle will be drawn taut causing the forward end of the left side lever 91 to be raised making the respective belt 74 slack and cutting out the driving power to the left side track. This will cause the right side track to turn the vehicle to the left since the right side track would still be in tension from its spring 130.

Simultaneously, as the power is removed from the left side as described, the braking cable 250 will be caused to be pulled forwardly since it is connected to portion 160 of the left side cable 140, as will draw the V-belt 230 taut against the braking pulley 210 on the left side as further assists the left side of the vehicle to stop for a most rpaid turning of the vehicle to the left since the right side at such times is under full power. This makes for most wonderful turning control of the vehicle.

Such rapid turning control is sometimes very vital to avoid a serious accident.

The reverse of these operations happens when the steering wheel is turned in the direction of the arrow 320 in FIG. 5 because in that case the right side cable 140 is tensed for relieving the tension on the right side spring 130 causing the right side lever 91 to raise at its forward end for placing slack in the right side belt 74 cutting off power to the right track 102 and simultaneously braking occurs through the right side braking assembly 200.

Control of the speed of the vehicle can be done by a throttle means of any conventional description, but as all that is old, it is represented for convenience, simply by a throttle lever 410.

As the vehicle moves across rough terrain, the track pulleys 100 at the rearward ends of the vehicle and also track pulleys 420 and 430 at the forward ends of the vehicle will not be subjected to the main forces of gravity because the lower portion of the track 102 on each side is held downward by roller means 460 carried on levers 462 which are pivotally connected to the frame by suitable means 470, with the levers 462 held down by springs 500 which are attached each to a lever 480 and are also suitably attached to the frame 12, whereby the springs compress as the belt portion thereneath hits a small rise in the ground whereby the weight of the vehicle is supported on spring and roller assemblies given the numeral 510 as a general designation and which serve to give the vehicle a smoother ride, thus defining a true off-the-road vehicle, as is much to be distinguished from any vehicle lacking the spring support feature provided by these spring assemblies 510.

The actual field in which this invention is made is further to be identified as the field of off-the-road vehicles by the fact that the tracks 102 are of a very substantial width for supporting the vehicle even when it is traveling over snow or a soft terrain such as mud. It is, therefore, significant that the width of the left track plus the width of the right track total a dimension which is preferably at least one-fourth and still more preferably greater than one-third of the total lateral width of the vehicle from its right side to its left side.

Another feature distinguishing the field of the invention is the fact that the pulleys 420 and 430 on each side which engage a respective track are disposed one below and to the rearward of the other so as to cause the track to have an upward and forwardly inclined portion 600 which is adapted to engage an irregularity in the surface of the ground whereby the vehicle can climb over the irregularity in a manner much more effective than does the inclined forward lower side of even a large wheel of a vehicle of the type having ground-engaging wheels.

The off-the-road vehicle of this invention is designed to have its upper side substantially completely covered by a covering 620, a portion of which is broken away in FIG. 5, so as to provide a surface on which passengers can ride and on which hunting equipment and the like can be carried, the vehicle having a well 630 extending downwardly for the reception of the legs of an operator sitting at the steering wheel 190, the well being open from the top of the vehicle down to a place on the underside of certain upwardly inclining frame members 640 of the frame 12, which latter support bearing means 660 for the respective forward track carrying pulleys 420 and 430.

It is desired that a vehicle of this type not have an excessive spacing between its tracks because the center of the vehicle might tend to become high-centered on a high point in the ground between the tracks causing the vehicle to become stuck thereon. For this reason, the space between the tracks is preferably so little that the remaining space between the frame members 670 that are disposed immediately inward from the respective track is too small a space for an operator of adult size, or rather of average adult size, to sit on. This problem is solved by placing the riding seat 680 for the driver of the vehicle across the top of the frame members 670 and substantially at the top of the vehicle, whereby the larger parts of the driver, namely, the driver's shoulders and hips are disposed outside of the space between the tracks, whereby it is only his legs which extend down into the well 630 between the tracks.

In this regard, we refer to FIG. 1 in which the leg well 630 has side walls 680 which can be seen in FIG. 5 and which separate the leg compartment or leg well 630 from the track areas, the walls 680 on the left side of the vehicle can be seen in FIG. 1, although a portion thereof is broken away in FIG. 1 along a breakaway line 682 for showing the leg compartment 630 therein and also for showing how a very strong floor enclosure member 700 is fastened to and extends between those frame members 730 of the vehicle which extend longitudinally thereof and are disposed directly beneath the frame members 670.

A modification is shown in FIG. 5 in which the modified two-track vehicle 1000 is shown with a special steering assembly generally indicated at 1002 having a manually engageable uppermost portion 1010 which is preferably in the form of a handle-bar which is elongated transversely of the direction of travel of the vehicle 1000, the steering assembly further having a supporting portion 1020 at its lower end which is in the form of a shaft extending horizontally and lengthwise of the vehicle 1000 and in alignment with its line of draft, the supporting portion 1020 being disposed in the center of the vehicle from side to side and being rotatably attached to the frame 1030 of the vehicle by suitable means such as a sleeve 1040 which snugly and rotatably fits the supporting portion 1020 in a manner for permitting the portion 1020 only to rotate about its axis which is horizontal and in alignment with the line of draft.

The sleeve 1040 is connected to the frame 1030 by a connecting means at 1050.

Between the supporting portion 1020 and the manually engageable portion 1010 is disposed a connecting portion 1060 of the steering assembly 1002. The connecting portion 1060 would, in side elevation, be concave on its rearward side so that its lower portion 1090 is out of the way of the feet of the operator as much as possible as the lower portion 1090 is disposed in a foot-receiving or leg-receiving well 1092 which is the equivalent of a well 630 of the modification of FIG. 1. The connecting portion 1060 is, therefore, connected to the forward end of the supporting portion 1020 and also connected to the forward side, preferably, of the handle-bar 1010 from which latter it extends forwardly and downwardly and then rearwardly and downwardly to provide room for the operator's legs and feet to be received to the rearward thereof.

Figure 6:
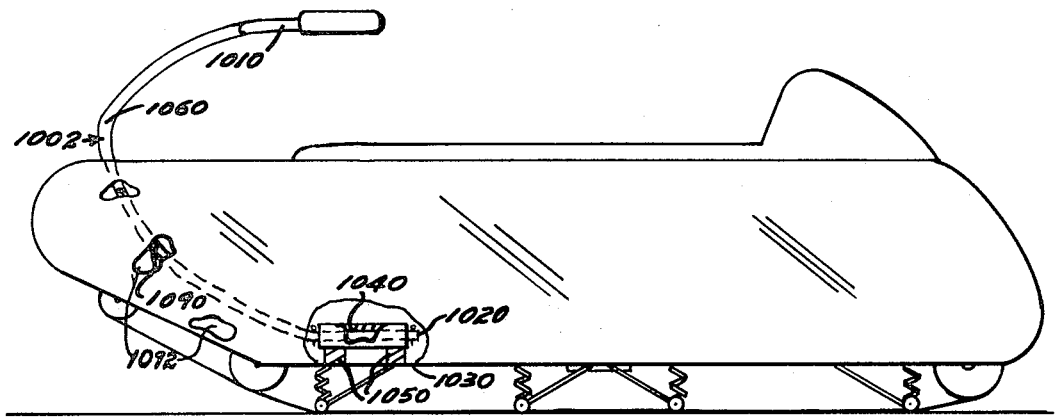
FIG. 6 is a side view of a modification of the invention showing a different form of steering, parts being broken away and some parts being shown in section.
Figure 7:
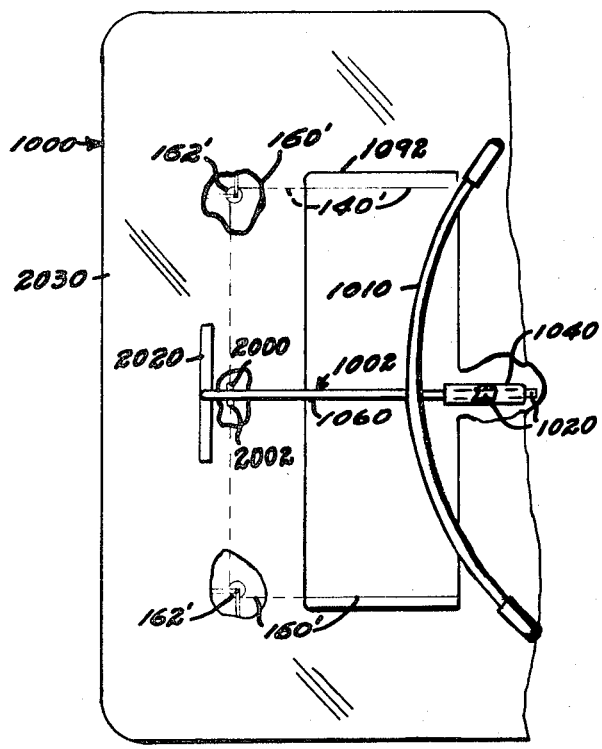
FIG. 7 is a top plan view of the forward part of the modified machine of FIG. 6 with some parts broken away and others showing in dotted lines.

In FIG. 6 a cable 140' can be seen to have its two sections 160' extending over pulleys 162' and then inwardly to points of connection 2000 and 2002 of the respective portions 160' of the cable with that part of the connecting portion 1060 of the steering assembly which is on a same level or approximately on the same level with the pulleys 162'. The connecting portion 1060 has its forwardmost part extending down through a slot 2020 in a forward top cover portion 2030 of the vehicle, the slot 2020 extending transversely of the machine at center thereof.

In operation, it will be seen that the operator holding the ends of the handle-bar 1010 steers, not by rotating the handle-bar as on a motor cycle, but instead, by causing the handle-bar to move to the right or left thereby causing the connecting portion 1060 to pull or release tension on respective ones of the cable sections 160'.

This has the same effect as the pulling and releasing of the respective cable sections 160 in the steering wheel and drum steering assembly shown in the modification of FIG. 5, whereby its operation with respect to the steering of the vehicle need not be further described as it is the same as regards what it is that the cable sections 160' are attached to, as it is in the modification of FIG. 5.

All other parts of the modification of FIG. 5 can be the same as those of the modification of FIG. 1.

Referring to FIG. 1, one of a pair of extra-tension assemblies 3000 is generally indicated. The assemblies 3000 are on the right and left-hand sides of the vehicle and are for the purpose of pulling down on the forward ends of the respective slack take-up levers 91 in order to increase belt pressure for drive, as is important when the vehicle is starting uphill from a dead start and greater friction to the drive is required.

Each extra-tension assembly 3000 comprises a power-increasing pulley system 3002, which latter each have two double pulleys disposed one above and one below each other, the upper one secured to the underside of the lever 91 on the respective side and the lower one secured to a frame member 132. A cable 3010 extends forwardly from the lower pulley and extends around a right or left forward extra-tension assembly sheave 3030 rotatably mounted by suitable means 3032 to the frame of the vehicle. The sheaves 3030 are disposed forwardly of the leg well 630 on the right and left sides thereof, and respective cables 3010 on the right and left-hand sides extend rearwardly from their respective sheaves 3030 up through slots 3036 in the deck so that a handle 3060 disposed rearwardly of the steering column 178 has its ends suitably attached to the respective cables 3010 where they extend rearwardly from the slots 3036.

As thus described, in operation, to increase driving friction, an operator can reach forward and with both hands grip the handle 3060 pulling it upwardly and rearwardly which will cause the pulley assemblies 3002 to draw the forward end of the respective take-up levers downwardly with considerable power, placing a tension on the belts 74 sufficiently for driving the vehicle up a steep hill from a standing start. Once the vehicle is in motion, the handle 3060 can be released, as steering will then be normal.

It will be seen that the tracks 102 can be also defined as moving ground-engaging means or tracks 102 in which the ground-engaging means can be said to be movable with respect to the frame and as having right and left ground-engaging portions, which are the right and left tracks 102, disposed on the right and left sides of the vehicle and each ground engaging portion 102 of the ground engaging means represented by both engaging portions 102 can be defined as follows: the areas of a flat horizontal surface supporting said vehicle and which would be touched by either one of the right and left ground-engaging portions and lie along a straight line extending from side-to-side of the vehicle being spaced apart a distance which is at least one-sixth of the total width of the vehicle for vehicle support on soft terrain, the ground-engaging means being of sufficient size as viewed from the underside of the vehicle as to be suitable for the purpose of substantially supporting the weight of the vehicle and the weight of a man operating the vehicle sufficiently for effective locomotion on both soft and rough terrain.

The importance of defining the tracks 102 as a ground-engaging means and of also defining each track individually as a left or right ground-engaging portion is for the purpose of calling attention to the fact that the principle invention itself is in the use of the belt clutch steering system above defined in an off-the-road vehicle with the width of the tracks or ground-engaging portions being a way of structurally identifying the vehicle as an off-the-road vehicle suitable for soft or rough terrain.

It will be seen that each lever 91 can be considered to have an elongated forward portion extending forwardly of the pivot means 94 and a rearward portion extending rearwardly from the pivot means 94 to the belt-engager or pulley 110 respectively, the forward and rearward portions of each lever 91 being drivably connected together and having lengths which when combined total a sum which is over one-third of the length of the entire vehicle.

I claim:

1. A two-track vehicle for use in both soft and rough terrain having a frame, two endless tracks disposed one on each side of said frame, portions of both forward and rearward undersides of said tracks being the lowest parts of said vehicle during operation, said tracks being of the type which are sufficiently wide as to be for the purpose of substantially supporting the weight of said vehicle and the weight of a man operating said vehicle sufficiently for effective locomotion on both soft and rough terrain including soft snow, track mounting means comprising roller means operably mounting said tracks on said frame for the travel thereof in endless configurations, spring means forming parts of said track mounting means and operably disposed between at least certain ones of the rollers of said roller means and said frame to cushion the shock from rough terrain, certain ones of said roller means being track driving cog wheels, and each of said tracks having spaced recesses therein receiving cogs of said cog wheels, a belt clutch assembly comprising: a driving and a driven shaft mounted on said frame, a set of V-belt pulleys comprising a driving pulley on said driving shaft and a driven pulley on said driven shaft and drivably connected to the track driving cog wheel of one of said tracks, a V-belt around said pulleys and when taut transferring power to said driven pulley and when loose allowing sufficient slippage of said belt as to substantially remove driving power transfer, a belt-engager disposed adjacent said belt between said driving and driven pulleys, a second belt clutch assembly of similar description and having its driven pulley drivably connected to the other one of said tracks, said belt clutch assemblies being mounted on the right and left hand sides of said vehicle, said V-belts not supporting any part of the weight of said vehicle, an engine mounted on said frame, means drivably connecting the crankshaft of said engine and the shafts of said right and left driving pulleys, controllable first and second belt engager movers, means mounting said movers movably on said frame so that each can move in each of two opposite directions, two springs, means attaching each of said springs to a different one of said movers to bias its mover in a given direction respectively, and steering force transfer means attaching said first and second movers each to a respective one of said belt-engagers in operative correlation so that movement of either of said first and second movers in a respective direction opposite to said respective given certain direction against the urging of the respective spring will cause the respective attached one of said belt-engagers to release stretching pressure on its belt and so that said springs normally bias said belt engagers against said belts respectively, and said first and second movers having normal positions in which said springs cause said belt engagers to exert enough stretching pressure on said belts respectively to transfer driving force from said belts to said tracks respectively, manual steering control means movable in each of two opposite steering control directions and connected to said first and second movers for holding them normally in position for holding both belts taut and for at times moving said movers into positions in which a selective one of said movers is in position for causing its belt to be taut and its track to be driven while the other is in a position for causing pressure on its belt to be released so that driving force on its track is released sufficiently that turning of the front of said vehicle to the side of the released track can be controlled, and in which right and left extra-tension assemblies are provided, each of said extra-tension assemblies having a portion engageable by the operator of said vehicle for initiating its action, each of said extra-tension assemblies having extra-tensioning means operably correlated with and connected to said operator engageable portion and to a respective one of said first and second movers, whereby when the operator causes a movement of said respective operator engageable portions, said extra-tension assemblies will exert a force on said first and second movers respectively for causing said first and second movers to place extra tension on said belts for increasing the driving friction thereof as is especially useful when the vehicle is being started from a dead stop while headed uphill, when said operator engageable portions are released by the operator, said extra-tension assemblies releasing the said extra pressure on said belts for returning drive to normal condition.

2. A two-track vehicle for use in both soft and rough terrain having a frame, two endless tracks disposed one on each side of said frame, portions of both forward and rearward undersides of said tracks being the lowest parts of said vehicle during operation, said tracks being of the type which are sufficiently wide as to be for the purpose of substantially supporting the weight of said vehicle and the weight of a man operating said vehicle sufficiently for effective locomotion on both soft and rough terrain including soft snow, track mounting means comprising roller means operably mounting said tracks on said frame for the travel thereof in endless configurations, spring means forming parts of said track mounting means and operably disposed between at least certain ones of the rollers of said roller means and said frame to cushion the shock from rough terrain, certain ones of said roller means being track driving cog wheels, and each of said tracks having spaced recesses therein receiving cogs of said cog wheels, a belt clutch assembly comprising: a driving and a driven shaft mounted on said frame, a set of V-belt pulleys comprising a driving pulley on said driving shaft and a driven pulley on said driven shaft and drivably connected to the track driving cog wheel of one of said tracks, a V-belt around said pulleys and when taut transferring power to said driven pulley and when loose allowing sufficient slippage of said belt as to substantially remove driving power transfer, a belt-engager disposed adjacent said belt between said driving and driven pulleys, a second belt clutch assembly of similar description and having its driven pulley drivably connected to the other one of said tracks, said belt clutch assemblies being mounted on the right and left hand sides of said vehicle, said V-belts not supporting any part of the weight of said vehicle, an engine mounted on said frame, means drivably connecting the crankshaft of said engine and the shafts of said right and left driving pulleys, controllable first and second belt engager movers, means mounting said movers movably on said frame so that each can move in each of two opposite directions, two springs, means attaching each of said springs to a different one of said movers to bias its mover in a given direction respectively, and steering force transfer means attaching said first and second movers each to a respective one of said belt-engagers in operative correlation so that movement of either of said first and second movers in a respective direction opposite to said respective given certain direction against the urging of the respective spring will cause the respective attached one of said belt-engagers to release stretching pressure on its belt and so that said springs normally bias said belt engagers against said belts respectively, and said first and second movers having normal positions in which said springs cause said belt engagers to exert enough stretching pressure on said belts respectively to transfer driving force from said belts to said tracks respectively, manual steering control means movable in each of two opposite steering control directions and connected to said first and second movers for holding them normally in position for holding both belts taut and for at times moving said movers into positions in which a selective one of said movers is in position for causing its belt to be taut and its track to be driven while the other is in a position for causing pressure on its belt to be released so that driving force on its track is released sufficiently that turning of the front of said vehicle to the side of the released track can be controlled, and in which said first and second movers are first and second elongated lever means having elongated forward portions extending longitudinally of said frame and operably connected at their forward ends to the respective said spring means and said forward lever portions being pivotally mounted at their rearward ends on said frame, each said lever means having a rearward portion rigidly attached to the respective said forward portion at one end thereof and having its other end connected to a respective belt engager, said belt engagers each being mounted closer to the place of said pivotal mounting of the respective lever than is the forward end of the forward portion of the respective lever.

* * * * *